Jan. 7, 1941.  R. ALKAN  2,227,529
GYROSCOPE
Filed Oct. 8, 1938  2 Sheets-Sheet 1

INVENTOR.
Robert Alkan
BY Stephen Gerstvik
ATTORNEY.

Jan. 7, 1941.    R. ALKAN    2,227,529
GYROSCOPE
Filed Oct. 8, 1938    2 Sheets-Sheet 2
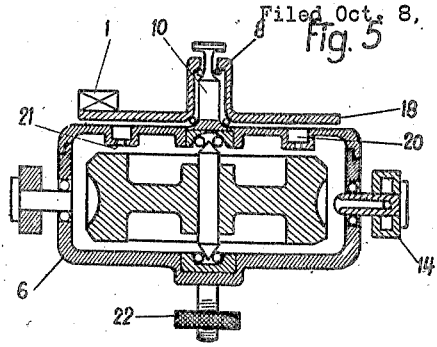
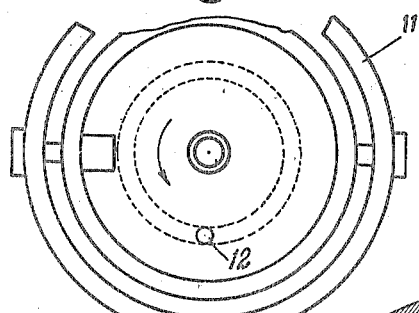
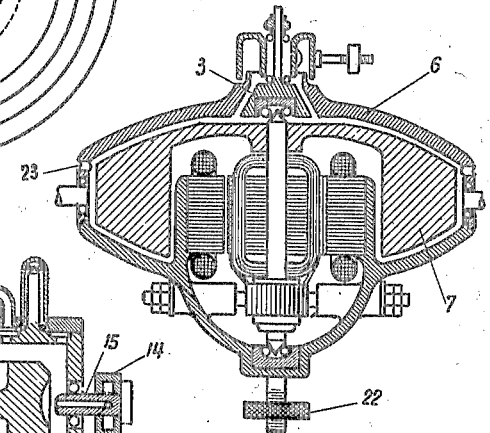
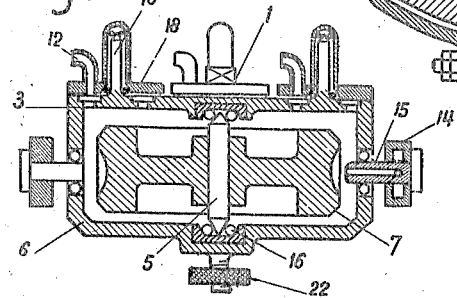
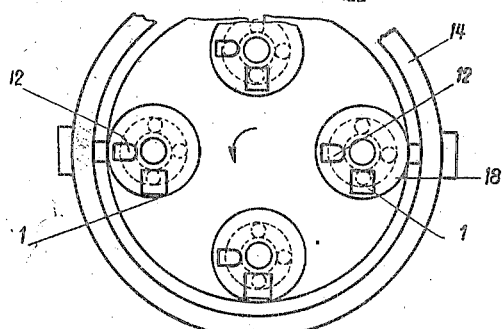
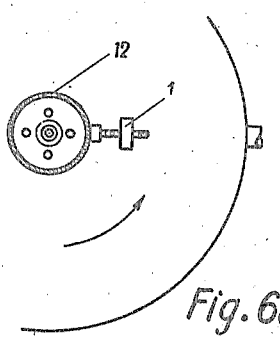
INVENTOR.
Robert Alkan
BY Stephen Cerstvik
ATTORNEY.

Patented Jan. 7, 1941

2,227,529

UNITED STATES PATENT OFFICE 2,227,529

GYROSCOPE

Robert Alkan, Paris, France

Application October 8, 1938, Serial No. 234,035
In France October 22, 1937

5 Claims. (Cl. 74—5)

The present invention relates to gyroscopes, and more particularly to gyroscopes of the type designed for use as gyro verticals or artificial horizons on board of dirigible craft.

It is a known fact that the spin axis of a gyroscope has a tendency to creep or precess from its normal position due to friction in the bearings thereof, and in the case of gyro verticals or artificial horizons, if the gyroscope is slightly pendulous, the vertical spin axis thereof will be caused to precess out of the vertical by the action of acceleration or deceleration forces produced when there is an increase or decrease in the speed of the craft on which the gyroscope is mounted.

Various means have been provided heretofore for maintaining the axis of the gyroscope in normal position or to return the same to such normal position when said spin axis is deviated therefrom.

In the case of gyro verticals or artificial horizons, these are usually provided with some form of gravitational control means, generally called erecting means, which cause the spin axis of the gyroscope to come to rest in a vertical position and to maintain it in this vertical position even though external acceleration forces may be acting on the gyroscope tending to deviate said axis from the vertical position.

One of the objects of the present invention is to improve the qualities of precision and sensitivity of gyroscopes and to make them more suitable for use on board of dirigible craft such as aircraft.

Another object of the invention is to provide novel and improved erecting means for gyroscopic devices of the type referred to above.

Another object of the invention is to provide novel erecting means for a gyro vertical or artificial horizon, comprising a single gravitational control means mounted for rotation and/or angular movement about the vertical spin axis of the gyroscope, and effective to control air jet means on said gyroscope to produce a stabilizing torque on the gyroscope when the axis thereof departs from the vertical, thereby causing said spin axis to return to its normally vertical position.

A further object of the invention is to provide novel and improved erecting means for gyroscopes of the class described, comprising air jet means mounted on the gyroscope and angularly adjustable with respect to said gyroscope.

A still further object is to provide novel erecting means for gyro verticals or artificial horizons, comprising air jet means angularly adjustable with respect to the gyroscope about an axis parallel to or coincident with the spin axis of the gyroscope.

A further object is to provide novel erecting means for gyro verticals or artificial horizons, comprising angularly adjustable air jet means mounted on the gyroscope for rotation and/or angular movement about the spin axis of the gyroscope or about an axis parallel to said spin axis, and controlled by acceleration responsive means.

A still further object of the invention is to provide, in combination with the gyroscope of a gyro vertical or artificial horizon, novel erecting means comprising air jet means angularly adjustable about the spin axis of the gyroscope or about an axis parallel to said spin axis, and acceleration responsive means responsive to acceleration components perpendicular to the spin axis of the gyroscope for controlling said air jet means.

A further object of the invention is to provide, in combination with a gyroscope, novel erecting mechanism comprising angularly adjustable air jet means controlled by acceleration responsive means which cause said air jet means to be adjusted at any instant so as to direct the air jet in a direction at right angles to the plane containing both the axis about which said air jet means are adjustable and the acceleration component perpendicular to said axis.

A still further object of the invention is to provide, in combination with a gyroscope, novel erecting mechanism comprising angularly adjustable air jet means controlled by acceleration responsive means and in which the frictional resistance of the acceleration responsive means is automatically compensated by the action of the air jet means.

A further object of the invention is to provide, in combination with a gyro vertical or artificial horizon of the type having a gyroscope pendulously mounted, novel erecting mechanism comprising angularly adjustable air jet means controlled by acceleration responsive means and in which the torque on the gyroscope resulting from acceleration forces acting on the pendulous gyroscope is automatically compensated by the action of said air jet means.

The above and other objects and features of the invention will appear more fully hereinafter from a consideration of the detailed description which follows, taken together with the accompanying drawings wherein several embodiments of the invention are illustrated by way of example. It is to be expressly understood, however, that the drawings are for purposes of illustration and description only and are not designed as a definition of the limits of the invention, reference being had for this purpose to the appended claims.

In the drawings, wherein like reference characters refer to like parts throughout the several views.

Figure 1:
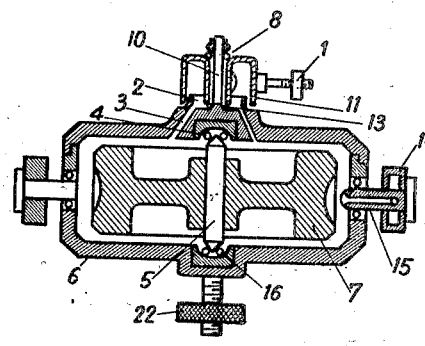
Fig. 1 is a vertical section of a gyroscope embodying one form of novel erecting means of the invention.
Figure 3:
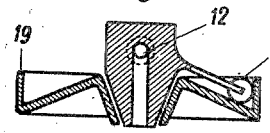
Figure 4:
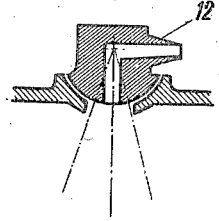
Figure 3A:
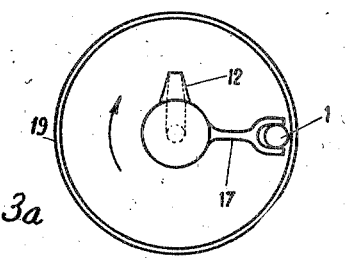

Figs. 2a, 2b, 2c, and 2d show diagrammatically various relative arrangements of certain parts of the gyroscope shown in Fig. 1, as viewed from the top thereof;

Fig. 3 is a detail vertical section of another embodiment of a part of the novel erecting means shown in Fig. 1;

Fig. 3a is a top plan view of the embodiment shown in Fig. 3;

Fig. 4 is a detail vertical section of another part of the novel erecting means shown in Fig. 1;

Fig. 5 is a vertical section of a gyroscope embodying another form of erecting means of the present invention;

Fig. 5a is a top plan view of the device shown in Fig. 5;

Fig. 6 is a vertical section of an electrically driven gyroscope embodying still another form of novel erecting means of the invention;

Fig. 6a is a partial top plan view of the device shown in Fig. 6;

Fig. 7 is another vertical section of a gyroscope provided with a still further embodiment of the invention; and Fig. 7a is a partial top plan view of the device shown in Fig. 7.

Referring to the drawings, and more particularly to Fig. 1, the invention is shown therein as embodied in a gyro vertical or artificial horizon comprising a gyroscope constituted by a fly wheel or rotor 7 having rotation in a clockwise direction carried by or formed integrally with a vertical shaft 5 journalled in ball bearings 4 and 16 forming part of a casing or housing 6 which encloses the rotor 7 and which is universally suspended for angular movement about two mutually perpendicular horizontal axes by means of trunnions 15 secured to or formed integrally with a gimbal ring 14 which is likewise pivoted in a well known manner on trunnions perpendicular to the first-mentioned trunnions.

The rotation of the gyro wheel or rotor 7 is produced, in the present embodiment, by vanes provided on its periphery and against which are directed air jets from nozzles generally located inwardly of the trunnions 15. Instead of permitting the air which has been used for driving the gyro rotor to escape directly into the space around the exterior of the casing 6, this air is directed through a passage 3 into a stack-like extension 2 provided on the upper side of the casing 6. This stack-like extension is covered by a hollow drum 11 closed at its upper end and journalled by means of ball bearings 8 and 13 on a shaft 10 which is secured to or formed integral with the casing 6. The annular connection between the lower end of the drum 11 and the extension 2 is made in the form of a baffled attachment which leaves full freedom for rotation of the drum about the shaft 10 but permits only a small quantity of air to escape.

In the present embodiment, the shaft 10, about which the drum 11 rotates, is shown coaxial with the rotor shaft 5 of the gyroscope so that the axis of spin of the gyroscope and the axis of rotation of the drum 11 are coincident. The gyroscope may be made slightly pendulous by attaching an adjustable weight 22 to the bottom side of the casing 6, said weight 22 being shown in the form of an internally threaded nut carried by a vertical screw projecting from the bottom side of said casing 6.

The novel erecting means of the present invention are now provided and, in the form shown, comprise air jet means illustrated as a reaction nozzle 12 secured to or formed integrally with the drum 11 and projecting radially therefrom. Thus, the nozzle 12 is adapted to be angularly adjusted and/or rotated with said drum 11 about the shaft 10 and, therefore, about the spin axis of the gyro rotor 7.

Acceleration responsive means are provided which are responsive to acceleration components perpendicular to the axis of rotation of the drum 11 and the rotor 7 for controlling the air jet means. In the form shown in Fig. 1, said acceleration responsive means comprise a mass or counterweight 1 adjustably carried on a radially projecting arm secured to the drum 11, said radially projecting arm being at right angles to the nozzle 12, and the mass or counterweight 1 being adjustable radially of the drum on said arm. Thus, it will be seen that the mass or counterweight 1 and said nozzle 12 are adapted for rotation with the drum 11 about the shaft 10 and, hence, about the spin axis of the gyroscope.

Since the mass 1 and nozzle 12 are angularly movable about the spin axis of the gyroscope, it will be apparent that when said spin axis departs from the vertical, said mass will tend to move into a plane containing said spin axis and the vertical, and will thereby angularly move the nozzle 12 so that the jet will issue from the nozzle 12 in a direction at right angles to a plane containing the spin axis of the gyroscope and the mass 1, thereby applying a torque in the gyroscope in a direction opposite to the direction in which the jet issues from the nozzle 12, this torque being produced by virtue of the reaction of said jet.

When the spin axis of the gyroscope is substantially vertical, the weight of the mass 1 tends to cause precession of the gyroscope in a plane perpendicular to the plane passing through the mass 1 and said spin axis. This will be apparent from Fig. 1 wherein it will be seen that the mass 1, being acted upon by gravity, tends to move downwardly to apply a torque on the gyroscope about the trunnions 15 which are perpendicular to the trunnions 15, and this torque then causes the gyroscope to precess in a plane passing through the spin axis of the gyroscope and perpendicular to the projecting arm carrying said mass, i. e., a plane perpendicular to the plane of the paper, as viewed in Fig. 1, and passing through shafts 5 and 10, i. e., through the spin axis of the gyroscope.

Figure 1A:
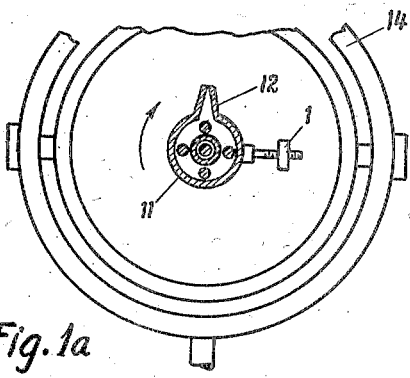
Fig. 1a is a top plan view of the gyroscope shown in Fig. 1.

Referring to Fig. 1a, assuming that the spin axis is caused to precess so that the top of shaft 10 moves downwardly, the mass 1 will likewise move downwardly by the action of gravity, and will tend to come to rest at a point 90° away in a clockwise direction, from its previous position, thereby moving the nozzle 12 to the position which was previously occupied by the mass 1. In other words, the drum 11 together with the mass 1 and nozzle 12 will be rotated 90° in a clockwise direction as viewed in Fig. 1a. The jet issuing from nozzle 12 will then issue in a direction to the right as viewed in Fig. 1a, thereby causing a reaction in the opposite direction, namely, to the left as viewed in Fig. 1a. This reaction applies a torque on the gyroscope about the trunnions which are perpendicular to the trunnions 15, thus causing the gyroscope to precess back to its original vertical position.

As soon as the gyroscope has been thus erected, however, the gravitational pull upon the mass 1 in its new position again causes precession of the gyroscope, thereby causing the mass 1 to again move by the action of gravity to another new position in the same direction as before, namely, clockwise as viewed in Fig. 1a and 90° away from its previous position, thereby again moving the nozzle 12 to a new position in which a torque will again be applied on the gyroscope to precess the same back to its vertical position. This action is reproduced in a continuous and symmetrical manner with respect to the shafts 5 and 10 and, hence, with respect to the spin axis of the gyroscope, and results in a continuous rotation of the drum 11, mass 1 and nozzle 12 about the spin axis of the gyroscope, such rotation being accompanied by a pseudo-nutation of the gyroscope, the amplitude of which can be made as small as desired by suitably proportioning the torques developed about the suspension axis of the gyroscope by the mass 1 and the reaction of the nozzle 12. The continuous rotation of the drum 11 resulting in the nutation of the gyro is produced by the resultant of the two torques exerted by the mass and reactive force of the nozzle since they produce simultaneous precessing torques.

This continuous rotation of the mass 1 and nozzle 12, when the spin axis of the gyroscope is substantially vertical, balances out the reaction effect of the jet issuing from the nozzle 12 until such time as the drum 11, mass 1 and nozzle 12 tend to stop rotating, such stopping action tending to occur when the spin axis of the gyroscope is caused to depart from the vertical by precession due to friction in the bearings of the rotor or due to precession caused by acceleration or deceleration forces acting on the pendulous gyroscope and produced by an increase or decrease in the flying speed of the aircraft on which the gyroscope is mounted.

Assuming now, for example, that the spin axis of the gyroscope is displaced from the vertical due to precession of the gyroscope by friction in its bearings or due to precession caused by forces of acceleration or deceleration acting on the gyroscope and produced by an increase or decrease in the flying speed of the aircraft on which the gyroscope is carried, the mass 1 will come to rest at a point lying in a plane passing through the spin axis and the component of the force of gravity perpendicular to said spin axis. In other words, the force of gravity acts on the mass 1 to move it to a new position in a plane containing the spin axis of the gyroscope and the vertical, since in that position the force of gravity is maximum. This results in an angular adjustment of the nozzle to a position in which it is substantially perpendicular to this plane, and the air jet escaping from the nozzle causes a torque to be applied on the gyroscope with respect to the suspension axis of the casing 6 in a direction lying in a plane which is substantially perpendicular to the plane containing the spin axis of the gyroscope and the vertical, thereby causing the gyroscope to precess back to the vertical.

When the craft upon which the gyro is mounted is caused to accelerate, the force of acceleration acts upon the mass 1 and also upon the weight 22. Such acceleration force produces a precession on the part of the gyro, moving the mass to a new position where the acceleration force tends to oppose the rotation of the mass and at this point, the mass being stationary, the air jet applies a reactive torque sufficient to precess the gyro and in the proper direction to maintain the spin axis in the vertical, provided the rotor spin is in the direction of the arrow of Figure 1a.

Figure 2A:
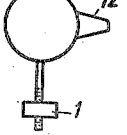
Figure 2B:
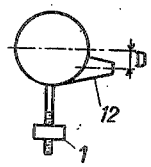

When the transverse accelerations acting on the gyroscope are small, the precession of the gyroscope due to the weight of the mass 1 causes a continuous rotation of this mass always in the same direction, as previously indicated, and this action may be utilized for compensating the frictional torque of the shaft 10 in its bearings by causing a constant opposite torque to be applied to the gyroscope by placing the nozzle 12 as shown in Fig. 2b so that the axis of the nozzle will be at a small distance D from the spin axis about which the reaction of the nozzle develops a compensating torque.

Figure 2C:
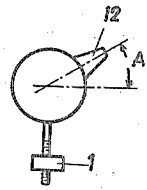
Figure 2D:
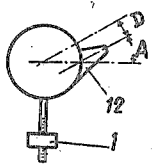

As previously indicated, it may be advisable to make the gyroscope slightly pendulous in its equilibrium condition about the axes of its Cardan suspension in order to facilitate stabilization of the gyroscope when it is first started in operation. Then the effect of the pendulosity of the gyroscope can be compensated, at least partially, by positioning the nozzle 12 as indicated at A in Fig. 2c so that the nozzle forms an obtuse angle with the radial arm which carries the mass 1. In this position, the nozzle 12 is effective to produce the component of reaction in a plane containing the longitudinal axis of the nozzle 12 and the radial arm on which the mass 1 is carried. Another modification for this purpose is shown in Fig. 2d.

Referring to Fig. 3, there is shown another form of erecting means of the invention in which the mass 1 is in the form of a ball and is caused to roll in a circular path or track formed by a cup-shaped member 19 attached to the upper side of the gyro casing 6, said ball being carried by a fork 17 secured to or formed integrally with a conical member adapted to take the place of the drum 11, said conical member also being formed to provide the nozzle 12. The conical member carrying the nozzle 12 is journalled on an air cushion formed between the external conical surface of said member and a cooperating conical surface of the cup-shaped member 19 instead of being journalled by ball bearings as in Fig. 1. The arrangement of the mass 1 in this embodiment avoids the influence of the weight of said mass on the centering of the air bearing.

In Fig. 4 is shown another embodiment wherein the assembly of the nozzle 12 and mass 1 is supported by an air cushion instead of by ball bearings.

Instead of setting the nozzle 12 radially of the spin axis of the gyroscope, said nozzle may be so arranged as to issue a jet in a direction parallel to the spin axis of the gyroscope, and the angular adjustment of the reactive force about the spin axis of the gyroscope may be replaced by providing means for angularly adjusting about said spin axis, the plane in which the reactive force is made manifest. Thus, as shown in Fig. 5, the angularly adjustable nozzle 12 may comprise an aperture 12 provided in a relatively thin horizontal disc 18 journalled on the shaft 10 by means of ball bearings 8 in a manner similar to that by which the drum 11 is journalled as shown in Fig. 1. The direction of rotation of the gyro rotor will be in a counterclockwise direction as indicated by the arrow of Figure 5a. The air issuing from the aperture 12 is fed through an annular groove 20 which communicates with the casing 6 by means of vents 21. The acceleration responsive mass 1 is mounted, as shown, on the upper side of the disc 18 at the periphery of the latter, the weight of the disc being partially supported by the pressure of the air which tends to escape from the annular groove 20, thereby considerably reducing the friction on the supporting ball bearing 8 and thus giving a greater sensitivity to the acceleration responsive mechanism.

If desired, the gyroscope may be driven electrically instead of by air, and instead of using air pressure for causing the stabilizing or erecting action on the gyroscope, a negative pressure, i. e., a vacuum, may be used as shown in Fig. 6, for example. The direction of gyro rotation is again taken in the direction indicated by the arrow of Figure 6a. In this latter embodiment the electrically driven gyroscope is designed to also function as a fan to cause a flow of air inwardly through the opening 12 (Fig. 6a) which is angularly adjustable by the acceleration responsive mass 1, and outwardly through peripheral openings or outlets 23 provided on the periphery of the stationary gyro casing 6. In this embodiment the aero-dynamical reaction effect causing the desired precession results only from the rotatable suction nozzle 12. In order to obtain precession in the proper direction in this embodiment, assuming that the direction of rotation of the gyro rotor about the spin axis is in a direction opposite to that in the embodiment which has a nozzle of the type that issues a pressure jet, the counterweight arm should be arranged 90° from the suction nozzle 12, the angle being measured in the same angular sense from that used in locating the counterweight from the pressure jet nozzle.

The axis of adjustment of the erecting means, instead of being made coincident with the spin axis of the gyroscope, may be made parallel to said spin axis, in which case it is advantageous to provide a plurality of nozzles each of which is angularly adjustable about its own axis parallel to the spin axis of the gyroscope, as shown in Figs. 7 and 7a. In this embodiment, the direction of gyro rotation being in a counterclockwise direction, four similar discs 18 are provided and each disc carries a nozzle 12 and an acceleration responsive mass 1, each mass being adapted to angularly adjust its associated disc so that the outlet of its associated nozzle is at right angles to the arm that carries the mass. In this embodiment, the erecting action of the four acceleration responsive means is cumulative so that the sum of the reaction forces of the four nozzles exerts the desired torque to cause erective precession of the gyroscope.

There are thus provided simple, novel and improved erecting means for gyroscopes, and particularly for gyro verticals or artificial horizons, for returning the spin axis of the gyroscope to its normal position in a quick and effective manner.

Although several embodiments of the invention have been illustrated and described, various changes in the form and relative arrangement of parts, which will now appear to those skilled in the art, may be made without departing from the scope of the invention. Reference is, therefore, to be had to the appended claims for a definition of the limits of the invention.

What is claimed is:

1. In combination, a gyroscope having three degrees of freedom, air jet means mounted for rotation on said gyroscope for applying a torque to said gyroscope about one axis thereof, and gravitational control means connected to and relatively fixed with respect to said air jet means for directing said air jet means.

2. In combination, a gyroscope having three degrees of freedom, air jet means for applying a torque to said gyroscope about one axis thereof, and gravitational control means connected to and relatively fixed with respect to said air jet means mounted for rotation about another axis of said gyroscope for controlling said air jet means.

3. A gyroscopic apparatus comprising a universally supported gyroscope, means for exerting an erecting torque on said gryoscope during deviation thereof from its normal position, said erecting means comprising a plurality of air jet means mounted for rotation on the gyroscope, and gravity controlled means connected to and relatively fixed with respect to said air jet means for controlling said air jet means.

4. A gyroscopic apparatus comprising a universally supported gyroscope, and means for exerting an erecting torque on said gyroscope during deviation thereof from its normal position, said erecting means comprising air jet means mounted for rotation on the gyroscope, and acceleration responsive means connected to and relatively fixed with respect to said air jet means for rotating said air jet means.

5. A gyro vertical or artificial horizon comprising a gyroscope having a rotor mounted for rotation about a vertical axis and for angular movement about two mutually perpendicular horizontal axes, a housing for said rotor, air jet means mounted for rotation about an axis parallel to the spin axis of said rotor and arranged to produce a reactive force in a direction perpendicular to said spin axis, and a mass attached to and rotatable with said air jet means and extending radially from the axis of rotation of said air jet means in a direction at right angles to the direction of the reactive force produced by said air jet means, whereby said mass is effective to direct said air jet means in a proper direction to return the spin axis of said gyroscope to the vertical position upon deviation of said spin axis from such vertical position.

ROBERT ALKAN.